(12) United States Patent
Heil et al.

(10) Patent No.: US 10,065,688 B2
(45) Date of Patent: Sep. 4, 2018

(54) VEHICLE, SYSTEM, AND METHOD FOR CONTROLLING ACTIVE AERODYNAMIC ELEMENTS

(71) Applicant: GM GLOBAL TECHNOLOGY OPERATIONS LLC, Detroit, MI (US)

(72) Inventors: Edward T. Heil, Howell, MI (US); Jason S. Rhee, Canton, MI (US); Hualin Tan, Novi, MI (US); Joshua R. Auden, Brighton, MI (US); Jason D. Fahland, Fenton, MI (US); Kevin Irwin, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/212,929

(22) Filed: Jul. 18, 2016

(65) Prior Publication Data
US 2017/0088201 A1  Mar. 30, 2017

Related U.S. Application Data

(60) Provisional application No. 62/232,907, filed on Sep. 25, 2015.

(51) Int. Cl.
*B62D 37/02* (2006.01)
*B62D 35/00* (2006.01)

(52) U.S. Cl.
CPC ........... *B62D 37/02* (2013.01); *B62D 35/005* (2013.01); *B62D 35/007* (2013.01); *Y02T 10/88* (2013.01)

(58) Field of Classification Search
CPC .... B62D 37/02; B62D 35/005; B62D 35/007; Y02T 10/88
See application file for complete search history.

(56) References Cited

U.S. PATENT DOCUMENTS

| 6,408,229 | B1 | 6/2002 | Loudon et al. |
| 9,561,827 | B2 * | 2/2017 | Parry-Williams ...... B62D 37/02 |
| 2006/0202508 | A1 * | 9/2006 | Aase .................... B60K 11/085 296/180.1 |

(Continued)

FOREIGN PATENT DOCUMENTS

| CN | 102341284 A | 2/2012 |
| CN | 104443072 A | 3/2015 |

(Continued)

*Primary Examiner* — Behrang Badii
*Assistant Examiner* — Daniel Lawson Greene
(74) *Attorney, Agent, or Firm* — Quinn IP Law

(57) ABSTRACT

A vehicle includes a motor for propelling the vehicle and at least one active aerodynamic element configured to generate a variable amount of aerodynamic downforce on the vehicle when the vehicle is in motion. The vehicle also includes at least one driver input sensor configured to detect a driver input and generate a feedforward signal indicative of a desired behavior of the vehicle. The vehicle additionally includes a controller in communication with the at least one driver input sensor and the at least one active aerodynamic element and configured to regulate the at least one active aerodynamic element at least partially in response to the feedforward signal. A method for controlling such an active aerodynamic element and a system for controlling an aerodynamic downforce on a vehicle are also disclosed.

20 Claims, 2 Drawing Sheets

(56) References Cited

U.S. PATENT DOCUMENTS

| | | | |
|---|---|---|---|
| 2007/0063541 A1* | 3/2007 | Browne | B62D 35/00 296/180.1 |
| 2007/0216194 A1* | 9/2007 | Rober | B62D 35/007 296/180.1 |
| 2009/0195016 A1 | 8/2009 | Schwan et al. | |
| 2013/0221701 A1* | 8/2013 | De Luca | B62D 35/007 296/180.5 |
| 2013/0226414 A1* | 8/2013 | De Luca | B62D 35/007 701/49 |
| 2013/0238198 A1* | 9/2013 | Prentice | B62D 35/02 701/49 |
| 2014/0097638 A1* | 4/2014 | Froling | B62D 35/02 296/180.1 |
| 2015/0084372 A1* | 3/2015 | Green | B60T 1/16 296/180.5 |
| 2016/0016451 A1* | 1/2016 | Izak | B60G 17/00 280/5.503 |
| 2016/0221613 A1* | 8/2016 | Handzel, Jr. | B62D 35/00 |
| 2016/0272198 A1* | 9/2016 | Matoy | B60W 30/045 |
| 2016/0272257 A1* | 9/2016 | McKillen | B62D 35/005 |
| 2017/0080987 A1* | 3/2017 | Morgan | B62D 37/02 |

FOREIGN PATENT DOCUMENTS

| | | |
|---|---|---|
| CN | 104670348 A | 6/2015 |
| CN | 104787132 A | 7/2015 |
| CN | 104828155 A | 8/2015 |
| CN | 104843092 A | 8/2015 |
| CN | 104843093 A | 8/2015 |
| CN | 104843094 A | 8/2015 |
| CN | 104859730 A | 8/2015 |
| CN | 104875795 A | 9/2015 |
| DE | 10136823 A1 | 2/2003 |
| EP | 2080694 A2 | 7/2009 |
| JP | 2010158977 A | 7/2010 |

* cited by examiner

VEHICLE, SYSTEM, AND METHOD FOR CONTROLLING ACTIVE AERODYNAMIC ELEMENTS

CROSS-REFERENCE TO RELATED APPLICATION(S)

This application claims the benefit of U.S. Provisional Application Ser. No. 62/232,907 filed Sep. 25, 2015, the entire content of which is hereby incorporated by reference.

TECHNICAL FIELD

The disclosure generally relates to vehicles with active aerodynamic elements and associated control methods therefor.

BACKGROUND

Vehicles often utilize aerodynamic elements to change the airflow around the vehicle. The aerodynamic elements typically function to increase aerodynamic downforce on the vehicle to enhance the vehicle's dynamic handling characteristics. Such aerodynamic elements include, but are not limited to, spoilers, wings, and air dams. Typically, along with an increase in aerodynamic downforce created by such aerodynamic elements, aerodynamic drag on the vehicle, particularly at high speeds, is also increased.

Some vehicles utilize active aerodynamic elements. Such active elements may change shape and/or be repositioned to change the aerodynamic properties of the vehicle while the vehicle is in motion, typically to improve handling and response of the vehicle. Such active aerodynamic elements may also be utilized to assist in braking of the vehicle. Additionally, such active aerodynamic elements may be utilized to change an airflow directed toward a cooling system of the vehicle.

SUMMARY

According to one embodiment, a vehicle includes a motor for propelling the vehicle and at least one active aerodynamic element configured to generate a variable amount of aerodynamic downforce on the vehicle when the vehicle is in motion. The vehicle also includes at least one driver input sensor configured to detect a driver input and generate a feedforward signal indicative of a desired behavior of the vehicle. The vehicle additionally includes a controller in communication with the at least one driver input sensor and the at least one active aerodynamic element and configured to regulate the at least one active aerodynamic element at least partially in response to the feedforward signal.

Each of the at least one active aerodynamic element may include an actuator configured to either change a shape of or reposition the respective active aerodynamic element relative to the vehicle to thereby vary the amount of the aerodynamic downforce on the vehicle. In such a case, the controller can be configured to control the actuator of each active aerodynamic element at least partially in response to the feedforward signal.

The vehicle may also include a steering wheel, an accelerator device configured to regulate a torque output of the motor, and a brake lever configured to retard the motion of the vehicle. In such a case, the at least one driver input sensor can include at least one of a steering wheel sensor configured to detect a rotational position of the steering wheel, an accelerator device sensor configured to detect a position of the accelerator device, and a brake lever sensor configured to detect a position of the brake lever.

In the case where the at least one driver input sensor includes the steering wheel sensor, the controller can be configured to determine, using the detected rotational position of the steering wheel, that the desired behavior of the vehicle is a desired lateral acceleration of the vehicle during cornering. Additionally, in such a case, the generated feedforward signal can be indicative of the desired lateral acceleration.

The vehicle may also include at least one vehicle performance sensor in communication with the controller. Each of such vehicle performance sensors can be configured to detect actual behavior of the vehicle and generate a feedback signal indicative of the detected actual behavior of the vehicle.

The vehicle may additionally include a road wheel, wherein the motor is coupled to the road wheel to propel the vehicle. The at least one vehicle performance sensor can include at least one of a wheel speed sensor configured to detect a rotating speed of the road wheel, an accelerometer configured to detect lateral or longitudinal acceleration of the vehicle, and a yaw-rate sensor configured to detect an angular velocity of the vehicle.

The controller can be configured to determine an actual lateral acceleration of the vehicle using the at least one vehicle performance sensor. In such a case, the controller can be additionally configured to regulate the at least one active aerodynamic element in response to the desired lateral acceleration and the determined actual lateral acceleration of the vehicle, i.e., using both, the feedforward and the feedback signals.

Another embodiment of the disclosure is directed to a method for controlling such an active aerodynamic element.

Yet another embodiment of the disclosure is directed to a system for controlling an aerodynamic downforce on a vehicle.

The above features and advantages and other features and advantages of the present teachings are readily apparent from the following detailed description of the best modes for carrying out the teachings when taken in connection with the accompanying drawings.

DETAILED DESCRIPTION

Figure 1:
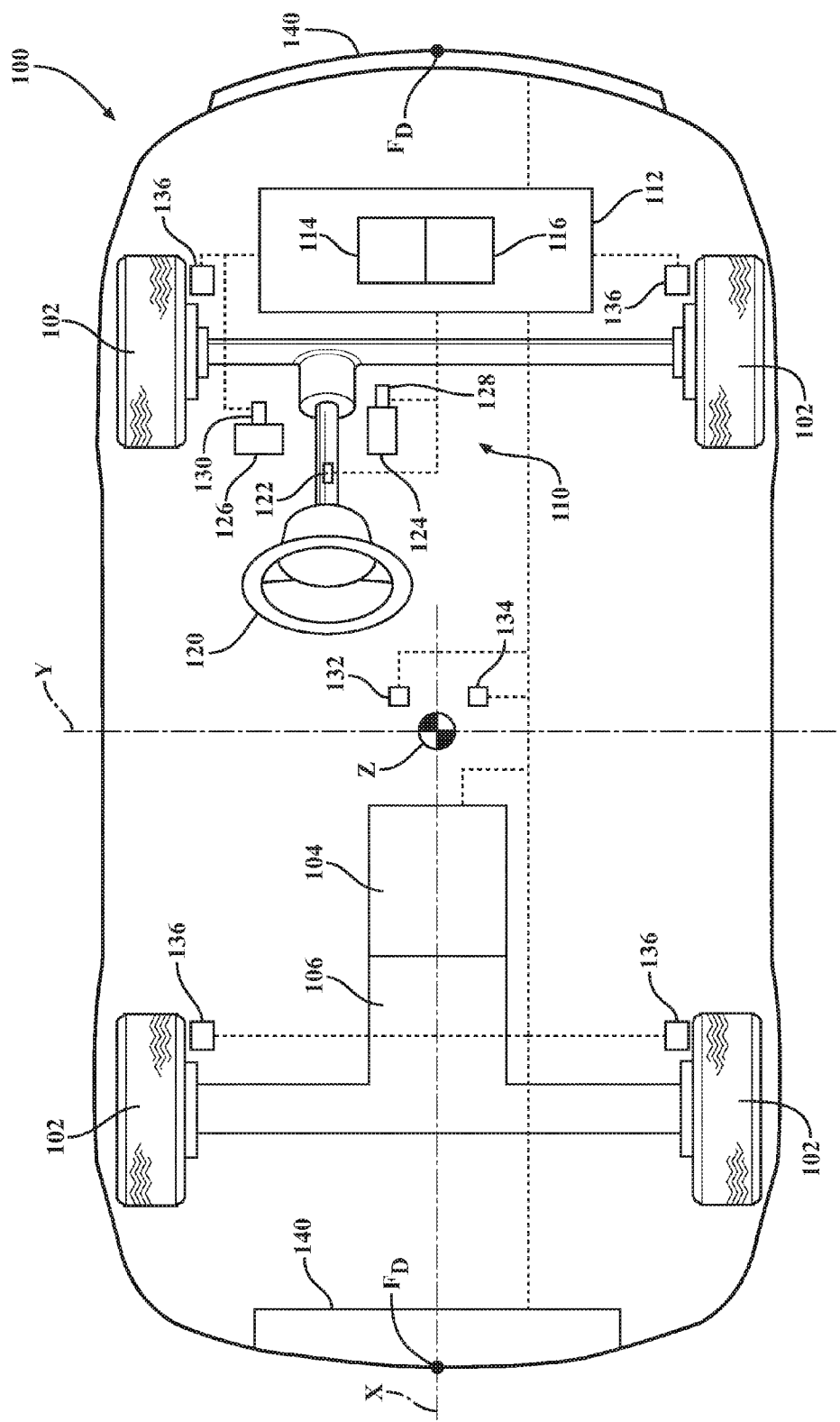
FIG. 1 is a block diagram of a vehicle employing active aerodynamic elements according to one embodiment of the disclosure.

Those having ordinary skill in the art will recognize that terms such as "above," "below," "upward," "downward," "top," "bottom," "front," "back," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions. Moreover, the term "coupled," as used herein, may denote either a direct connection between components or an indirect connection, where the subject components are not in physical contact with one another.

Referring to the figures, wherein like numerals indicate like parts throughout the several views, a vehicle 100, a control system 110, and method 200 are shown and described herein.

The vehicle 100 of the exemplary embodiment is an automobile. However, it should be appreciated that in other embodiments, the vehicle 100 may be implemented with a performance or racing vehicle, industrial vehicle, motorcycles, aircraft, watercraft, or any other similar apparatus.

The vehicle 100 of the exemplary embodiment includes a plurality of road wheels 102. The road wheels 102 may operatively engage the ground, a roadway, and/or other surface as appreciated by those skilled in the art. For instance, a tire (not shown) may be coupled to one or more of the road wheels 102, as is also appreciated by those skilled in the art. The vehicle 100 also includes a motor 104 for generating motion. The motor 104 is operatively connected or coupled to at least one of the road wheels 102 for rotating the subject wheel(s). The motor 104 may be an engine, e.g., an internal combustion engine, an electric motor, or other device for generating motion, as appreciated by those skilled in the art. The vehicle 100 may also include a transmission assembly 106 coupling the motor 104 to at least one of the road wheels 102. The transmission assembly 106 may be configured to change the rotational speed ratio between the motor 104 and the road wheel 102, as is readily appreciated by those skilled in the art.

The vehicle 100 of the exemplary embodiment includes a control system 110 for controlling aspects of the vehicle including speed and direction, as described in greater detail herein. The control system 110 includes at least one controller 112. In the exemplary embodiment, a single controller 112 is shown, but those skilled in the art appreciate that multiple controllers 112 may be utilized. The controller 112 of the exemplary embodiment includes a processor 114 capable of performing calculations and executing instructions (i.e., running a program). The processor 114 may be implemented with a microprocessor, microcontroller, application specific integrated circuit ("ASIC") or other suitable device. Of course, the controller 112 may include multiple processors 114 which may, or may not, be disposed in separate locations. The controller 112 of the exemplary embodiment also includes a memory 116 capable of storing data and in communication with the processor 114. The memory 116 may be implemented with semiconductors (not shown) or any other suitable devices. Multiple memories 116 may also be utilized.

The vehicle 100 of the exemplary embodiment also includes a steering wheel 120 coupled to at least one of the road wheels 102 for turning the subject road wheels. As is appreciated by those skilled in the art, an operator of the vehicle 100 may turn, i.e., rotate, the steering wheel 120 to alter a trajectory of the subject vehicle. The control system 110 includes a steering wheel sensor 122 in communication with the controller 112. The steering wheel sensor 122 is configured to detect the rotational position of the steering wheel 120, often referred to as the steering wheel angle, and communicate the detected rotational position to the controller 112. The steering wheel angle may also be utilized by the processor 114 to determine or compute a desired lateral acceleration of the vehicle 100 during desired vehicle cornering.

The vehicle 100 of the exemplary embodiment also includes an accelerator device, such as a switch or a pedal, 124 and a foot or hand operated brake lever, such as a pedal 126. The accelerator device 124 is utilized by the operator of vehicle 100 to control the vehicle's speed, particularly via regulating the torque output of the motor 104. The control system 110 includes an accelerator device sensor 128 configured to detect the position of the accelerator device 124 and, thus, the desired speed and/or desired change in speed of the vehicle 100. The accelerator device sensor 128 is in communication with the controller 112 to communicate the detected position of the accelerator device 124 to the controller 112. The brake lever 126 is generally utilized by the operator of the vehicle 100 to retard vehicle motion, i.e., to slow and/or stop the subject vehicle. The control system 110 includes a brake lever sensor 130 configured to detect the position of the brake lever 126. The brake lever sensor 130 is also in communication with the controller 112 to communicate the detected position of the brake lever 126 to the controller 112. The above described steering wheel sensor 122, the accelerator device sensor 128, and the brake lever sensor 130 may be generally identified as driver input sensors.

The controller 112 is configured to calculate gradients, that is, measures of change over time, for positions of the steering wheel 120, the accelerator device 124, and the brake lever 126 based on the readings provided by the steering wheel sensor 122, the accelerator device sensor 128, and the brake lever sensor 130, respectively. The controller 112 can be configured to determine via the signal from the steering wheel sensor 122 that the desired behavior of the vehicle 100 is an intended or desired lateral acceleration during vehicle turning or cornering.

In addition to the previously described driver input sensors 122, 128, 130, the control system 110 may also include various vehicle performance sensor(s) for detecting or measuring specific aspects of performance or actual behavior of the vehicle 100. Such vehicle performance sensors may include, but are not limited to, an accelerometer(s) 132 for detecting or measuring longitudinal acceleration of the vehicle 100, i.e., along an X-axis, and lateral acceleration of the vehicle, i.e., along a transverse Y-axis, and a yaw-rate sensor 134 for detecting an angular velocity of the vehicle around its vertical Z-axis, and wheel speed sensors 136 configured to detect rotating speeds of the respective road wheels 102 and thereby facilitate measurement of the road speed or velocity of the vehicle. The controller 112 can be additionally configured to acknowledge or verify that the vehicle 100 is in the process of turning or cornering via processing of the received signals from any of the respective vehicle performance sensors 132, 134, 136.

The vehicle 100 includes at least one active aerodynamic element 140. As shown in FIG. 1, the active aerodynamic element 140 is in operative communication with the controller 112. The active aerodynamic element 140 may be configured to change shape and/or be repositioned to alter the aerodynamic properties of the vehicle 100, while the vehicle is in motion. That is, the active aerodynamic element 140 can generate a variable amount of force, such as an aerodynamic downforce $F_D$ acting on the vehicle 100 substantially parallel to the Z-axis. In other words, as used herein, the term "aerodynamic downforce" is defined as an aerodynamic force acting on the vehicle 100 in a downward, normal direction relative to a direction of travel of the vehicle. As such the aerodynamic downforce $F_D$ is a negative lift force acting on the body of the vehicle 100 when the vehicle is in motion.

The downforce $F_D$ can be employed to enhance handling characteristics of the vehicle 100, specifically during cornering events, which can be detected by the position of the vehicle operator's steering wheel 120, as understood by those skilled in the art. The increase of the downforce $F_D$ by aerodynamic elements is generally accompanied by a corresponding increase in aerodynamic drag force (not shown). The subject drag force can be desirable during vehicle braking events, for which reason a position of the vehicle's brake pedal 126 can be detected, as understood by those skilled in the art, and used as a signal for controlling the downforce $F_D$ via one or more active aerodynamic elements 140, as will be discussed in detail below.

For example, a fin-like rear spoiler embodiment (not shown) of the active aerodynamic element 140 may be movable up or down and/or tilted to alter the aerodynamic properties of the vehicle 100. The active aerodynamic element 140 may also include an electric, mechanical, and/or hydraulic actuator (not shown), an electric motor (not shown), and/or other devices for changing shape and/or repositioning the subject active aerodynamic element relative to the vehicle 100 in response to specific commands issued by the controller 112. The controller 112 may also be configured to regulate the active aerodynamic element(s) 140 during the determined desired vehicle cornering.

Figure 2:
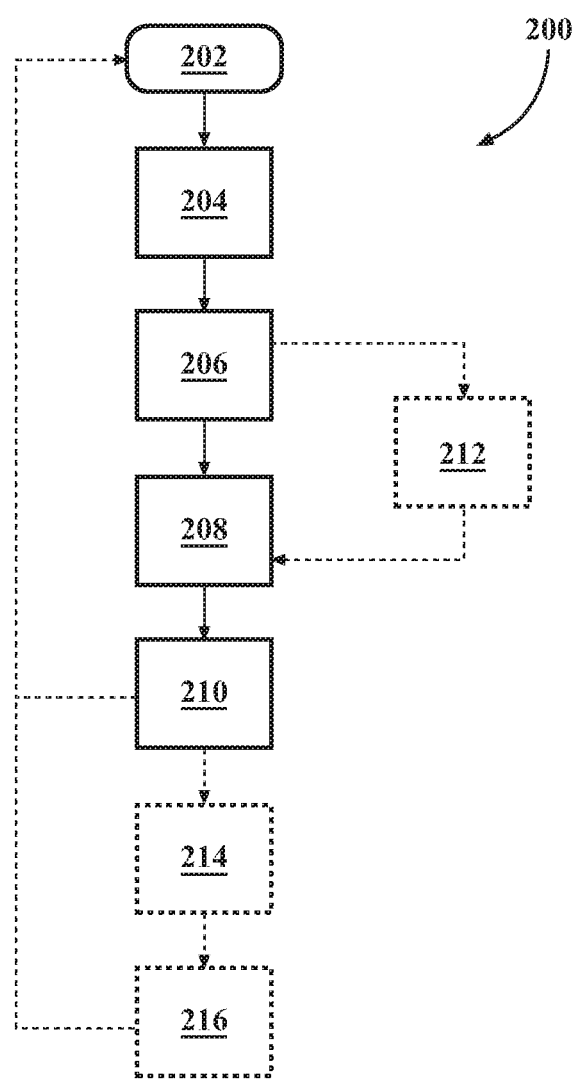
FIG. 2 is a flowchart of a method for controlling an active aerodynamic element of the vehicle shown in FIG. 1 according to another exemplary embodiment of the disclosure.

FIG. 2 depicts a method 200 for controlling the active aerodynamic element(s) 140, as described above with respect to FIG. 1. An exemplary embodiment of the method 200 shown in FIG. 2 commences in frame 202. In frame 202 the frame includes detecting and communicating via any of the driver input sensors 122, 128, 130 the respective driver input signal indicative of the desired behavior of the vehicle 100 when the vehicle is in motion. Following frame 202, the method proceeds to frame 204, where the method includes receiving, via the controller 112, the at least one driver input signal. As described with respect to FIG. 1, these driver input signals may include, but are not limited to, a desired lateral acceleration (e.g., calculated from the detected position of the steering wheel 120), a gradient of the steering wheel 120 angle, a desired brake force (e.g., calculated from the detected brake lever 126 position), a gradient of the desired brake force, a position of the accelerator device 124, and a gradient of position of the accelerator device.

In other words, in frame 204 the method 200 may include receiving, via the controller 112, driver input signal(s) as detected by any of driver input the sensors 122, 128, 130. The received driver input signal(s) may also include a detection or determination of whether the vehicle 100 is operating on a racetrack or in a track mode, for example via a selection using a dedicated switch or other operator interface. The at least one driver input signal may be referred to as a "feedforward" signal because this signal is not dependent on the actual performance and/or behavior of the vehicle 100, but is rather indicative of a desired or intended performance and/or behavior, i.e., target response, of the vehicle 100 as requested via a specific input by the driver.

It should be noted that the determination of whether the vehicle 100 is operating on a racetrack may be accomplished via a sensed or estimated lateral acceleration and/or speed of the vehicle, such as by utilizing data received by the controller 112 from the vehicle performance sensors 132, 134, and 136. An exemplary technique for determination of whether the vehicle 100 is operating on a racetrack is described in the U.S. Pat. No. 6,408,229.

The method 200 also includes, in frame 206, determining or calculating, via the controller 112, an aerodynamic force target utilizing the at least one driver input signal. The aerodynamic force target may reflect a measure of the downforce $F_D$ that is desired to be produced on the vehicle 100, including by the at least one active aerodynamic element 140. In the exemplary embodiment, calculating the aerodynamic force target may include converting and calibrating each received driver input signal from any of the driver input sensors 122, 128, 130 to common units. Calculating the aerodynamic force target may further include summing the driver input signals from one or more driver input sensors 122, 128, 130 to generate a continuous, feedforward signal in accordance with the target signal. In one embodiment, the aerodynamic force target would reflect a greater downforce $F_D$ when it is detected that the vehicle 100 is operating on a racetrack, than in non-racetrack situations. Such a control dichotomy can be beneficial to facilitate enhanced response of the vehicle 100 during competitive driving with high-g cornering experienced in vehicle racing, while favoring other factors, such as noise, comfort, and energy efficiency during general vehicle operation, for example, during a roadway commute.

In frame 206 the act of determining the aerodynamic force target may include generating a target signal of the vehicle 100, i.e., a signal indicative of a vehicle target response based on the driver input signal(s) received in frame 204, within one part of the controller 112 and then receiving the subject target signal within another part of the controller. For example, the target signal of the vehicle 100 can be generated by one processor 114 of the controller 112, and then received via a separate processor 114. In one example, the target signal is a desired yaw of the vehicle 100 that can be generated in response to the received driver input signal(s). Accordingly, in frame 206, the act of determining the aerodynamic force target may include each of the detected driver input signal(s) and the generated target signal.

Following frame 206, the method proceeds to frame 208, where the method includes generating, via the controller 112, the feedforward signal in response to the aerodynamic force target determined in frame 206. Following frame 208, the method advances to frame 210. In frame 210 the method includes actuating the at least one active aerodynamic element 140 based at least partially on the calculated aerodynamic force target. That is, the active aerodynamic element 140 is moved and/or controlled to change shape in response to the feedforward signal generated by the controller 112 at least partially in response to the calculated aerodynamic force target.

Additionally, following frame 206, but prior to frame 208, the method may advance to frame 212. In frame 212 the method may include determining, via the controller 112 using the detected rotational position of the steering wheel via the steering wheel sensor 122, that the desired behavior of the vehicle 100 is a desired lateral acceleration of the vehicle during cornering.

After frame 210, the method may proceed to frame 214, where the method may include detecting actual behavior of the vehicle 100 and generating a feedback signal indicative of the detected actual behavior of the vehicle via any of the vehicle performance sensors 132, 134, and 136. In frame 214, the method may additionally include determining, via the controller 112, the actual lateral acceleration of the vehicle 100 using at least one of the vehicle performance sensors 132, 134, 136. For instance, the accelerometer(s) 132 may be used to provide lateral and/or longitudinal acceleration of the vehicle 100, the yaw sensor 134 may be utilized to provide the yaw of the vehicle 100, and/or wheel speed sensors 136 may be used to provide rotating speeds of the respective road wheels 102, when the target signal indicative of the vehicle target response is any of the respective performance aspects of the vehicle 100. Accordingly, in frame 214, the method 200 may include determining, by the controller 112, the aerodynamic force target utilizing both the driver input signal(s) from any driver input sensor(s) 122, 128, 130 and feedback signals from any vehicle performance sensor(s) 132, 134, 136.

For example, the controller 112 can be configured to determine actual or current lateral acceleration of the vehicle 100 using the vehicle performance sensor(s) 132, 134, and 136. The controller 112 can be additionally configured to regulate the active aerodynamic element(s) 140 to achieve the desired lateral acceleration of the vehicle 100 during cornering in response to the determined actual lateral acceleration, i.e., based on the feedback signal. In such a case, a plurality of driver's input signals detected via the sensor(s) 122, 128, 130 can be utilized by a driver-intent algorithm in the controller 112 to generate a set of feedforward signal components. The feedforward signal components can be combined with feedback from the vehicle 100 performance signals measured or detected via the respective sensors 132, 134, and 136 to generate, via the controller 112, a target position for the at least one active aerodynamic element 140. Accordingly, in frame 214 the controller 112 can generate a corrected or updated feedforward signal for the active aerodynamic element(s) 140 that is indicative of both the desired lateral acceleration and the detected actual lateral acceleration of the vehicle 100.

After frame 214, the method may advance to frame 216. In frame 216, the method may include regulating the active aerodynamic element(s) 140 to a revised target position using the updated feedforward signal. Following either of the frames 210 or 216, the method 200 may loop back to frame 202 to resume control of the active aerodynamic element(s) 140 in response to an additional maneuver of the vehicle 100, as detected by the vehicle performance sensors 132, 134, 136, or another request from the driver, as detected by the driver input sensors 122, 128, 130.

The vehicle 100, system 110, and the method 200 described herein provide numerous advantages. First, the response of the active aerodynamic elements 140 to the driver input can be improved which, in turn, can improve handling, i.e., controllability of the vehicle 100. Improved handling of the vehicle 100 can be used by the driver to improve, i.e., lower, racetrack lap times. Second, the system 110 and method 200 using the described feedforward signal (s) indicative of driver input allow for more accurate adaptation of aerodynamic control to different driving styles. As a result, such adaptation of the active aerodynamic elements 140 to the driver input will provide greater consistency between drivers. Finally, the dynamic response of the vehicle 100 can be enhanced during cornering and other transient vehicle maneuvers.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
    a motor configured to propel the vehicle;
    at least one active aerodynamic element configured to generate a variable amount of aerodynamic downforce on the vehicle when the vehicle is in motion;
    at least one driver input sensor configured to detect a driver input and generate a feedforward signal indicative of a desired behavior of the vehicle; and
    a controller in communication with the at least one driver input sensor and the at least one active aerodynamic element and configured to regulate the at least one active aerodynamic element at least partially in response to the feedforward signal.

2. The vehicle according to claim 1, wherein each of the at least one active aerodynamic element includes an actuator configured to one of change a shape of and reposition the respective active aerodynamic element relative to the vehicle to thereby vary the amount of the aerodynamic downforce on the vehicle, and wherein the controller is configured to control the actuator at least partially in response to the feedforward signal.

3. The vehicle according to claim 1, further comprising a steering wheel, an accelerator device configured to regulate a torque output of the motor, and a brake lever configured to retard the motion of the vehicle, wherein the at least one driver input sensor includes at least one of:
    a steering wheel sensor configured to detect a rotational position of the steering wheel;
    an accelerator device sensor configured to detect a position of the accelerator device; and
    a brake lever sensor configured to detect a position of the brake lever.

4. The vehicle according to claim 3, wherein the at least one driver input sensor includes the steering wheel sensor, and wherein the controller is configured to determine, using the detected rotational position of the steering wheel, that the desired behavior of the vehicle is a desired lateral acceleration of the vehicle during cornering, such that the generated feedforward signal is indicative of the desired lateral acceleration.

5. The vehicle according to claim 4, further comprising at least one vehicle performance sensor in communication with the controller and configured to detect actual behavior of the vehicle and generate a feedback signal indicative of the detected actual behavior of the vehicle.

6. The vehicle according to claim 5, further comprising a road wheel, wherein the motor is coupled to the road wheel to propel the vehicle, and wherein the at least one vehicle performance sensor includes at least one of:
    a wheel speed sensor configured to detect a rotating speed of the road wheel;
    an accelerometer configured to detect lateral or longitudinal acceleration of the vehicle; and
    a yaw-rate sensor configured to detect an angular velocity of the vehicle.

7. The vehicle according to claim 6, wherein the controller is configured to determine an actual lateral acceleration of the vehicle using the at least one vehicle performance sensor and additionally regulate the at least one active aerodynamic element in response to the desired lateral acceleration and the determined actual lateral acceleration of the vehicle.

8. A method for controlling an active aerodynamic element of a vehicle, the method comprising:

detecting and communicating via at least one driver input sensor a driver input signal indicative of a desired behavior of the vehicle when the vehicle is in motion;

receiving, via a controller, the at least one driver input signal;

determining, via the controller, an aerodynamic downforce target utilizing the at least one driver input signal;

generating, via the controller, a feedforward signal in response to the determined aerodynamic downforce target; and actuating, via the controller, the active aerodynamic element at least partially in response to the feedforward signal to vary an amount of aerodynamic downforce on the vehicle.

9. The method according to claim 8, wherein said receiving, via the controller, the at least one driver input signal includes receiving a plurality of driver input signals, and said determining the aerodynamic downforce target includes summing the plurality of received driver input signals to generate a continuous feedforward signal.

10. The method according to claim 8, wherein active aerodynamic element includes an actuator configured to one of change a shape of and reposition the respective active aerodynamic element relative to the vehicle to thereby vary the amount of the aerodynamic downforce on the vehicle, and said actuating the at least one active aerodynamic element includes controlling the actuator, via the controller.

11. The method according to claim 8, wherein the vehicle includes a steering wheel and the at least one driver input sensor includes a steering wheel sensor configured to detect a rotational position of the steering wheel, the method further comprising determining, via the controller using the detected rotational position of the steering wheel, that the desired behavior of the vehicle is a desired lateral acceleration of the vehicle during cornering.

12. The method according to claim 11, wherein said generating the feedforward signal is indicative of the desired lateral acceleration.

13. The method according to claim 12, wherein the vehicle includes at least one vehicle performance sensor, the method further comprising:

detecting actual behavior of the vehicle and generating a feedback signal indicative of the detected actual behavior of the vehicle via the least one vehicle performance sensor; and determining, via the controller, an actual lateral acceleration of the vehicle using the at least one vehicle performance sensor.

14. The method according to claim 13, further comprising regulating the at least one active aerodynamic element in response to the desired lateral acceleration and the determined actual lateral acceleration of the vehicle.

15. A system for controlling an aerodynamic downforce on a vehicle, the system comprising:

at least one active aerodynamic element configured to generate a variable amount of the aerodynamic downforce on the vehicle when the vehicle is in motion;

at least one driver input sensor configured to receive a driver input and generate a driver input signal indicative of a desired behavior of the vehicle;

a controller in communication with the at least one active aerodynamic element and the at least one driver input sensor and configured to:

receive the at least one driver input signal from the at least one driver input sensor;

determine an aerodynamic downforce target utilizing the at least one driver input signal;

generate a feedforward signal in response to the determined aerodynamic downforce target; and actuate the at least one active aerodynamic element at least partially in response to the feedforward signal.

16. The system according to claim 15, wherein the controller is configured to receive a plurality of driver input signals, and additionally configured to determine the aerodynamic downforce target by summing the plurality of received driver input signals to generate a continuous feedforward signal.

17. The system according to claim 15, wherein each of the at least one active aerodynamic element includes an actuator configured to one of change a shape of and reposition the respective active aerodynamic element relative to the vehicle to thereby vary the amount of the aerodynamic downforce on the vehicle, and the controller is additionally configured to actuate the at least one active aerodynamic element via controlling the actuator.

18. The system according to claim 15, wherein the vehicle includes a steering wheel and the at least one driver input sensor includes a steering wheel sensor configured to detect a rotational position of the steering wheel, and wherein the controller is additionally configured to determine, using the detected rotational position of the steering wheel, that the desired behavior of the vehicle is a desired lateral acceleration of the vehicle during cornering.

19. The system according to claim 18, wherein the generated feedforward signal is indicative of the desired lateral acceleration.

20. The system according to claim 19, wherein the vehicle includes at least one vehicle performance sensor in communication with the controller and configured to detect actual behavior of the vehicle and generate a feedback signal indicative of the detected actual behavior of the vehicle, and wherein the controller is additionally configured to determine an actual lateral acceleration of the vehicle using the at least one vehicle performance sensor and regulate the at least one active aerodynamic element in response to the desired lateral acceleration and the determined actual lateral acceleration of the vehicle.

* * * * *